US010033764B1

(12) United States Patent
Nachenberg

(10) Patent No.: US 10,033,764 B1
(45) Date of Patent: Jul. 24, 2018

(54) SYSTEMS AND METHODS FOR PROVIDING SUPPLY-CHAIN TRUST NETWORKS

(71) Applicant: Symantec Corporation, Mountain View, CA (US)

(72) Inventor: Carey Nachenberg, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 156 days.

(21) Appl. No.: 14/942,995

(22) Filed: Nov. 16, 2015

(51) Int. Cl.
  H04L 29/06 (2006.01)
(52) U.S. Cl.
  CPC ............ H04L 63/20 (2013.01); H04L 63/105 (2013.01); H04L 63/1408 (2013.01)
(58) Field of Classification Search
  CPC . H04L 63/14; H04L 63/20; H04L 9/32; H04L 9/3202; H04L 9/321
  See application file for complete search history.

(56) References Cited

U.S. PATENT DOCUMENTS

| | | | | |
|---|---|---|---|---|
| 7,663,482 B1* | 2/2010 | Willms | .................. | G06Q 10/08 340/540 |
| 8,689,282 B1* | 4/2014 | Oprea | ..................... | H04L 63/20 726/1 |
| 9,027,135 B1* | 5/2015 | Aziz | ................... | H04L 63/1408 726/23 |
| 9,298,925 B1* | 3/2016 | Crittall | ................. | G06F 21/577 |
| 9,503,475 B2* | 11/2016 | Fadida | ................... | H04L 67/34 |
| 2005/0049891 A1* | 3/2005 | Wilson | .............. | G06Q 10/0637 705/39 |
| 2005/0049892 A1* | 3/2005 | Miller | .................... | G06Q 10/06 705/4 |
| 2009/0112643 A1* | 4/2009 | Brys | ..................... | G06F 21/552 705/37 |
| 2011/0214187 A1* | 9/2011 | Wittenstein | ......... | H04L 63/1425 726/25 |
| 2016/0119372 A1* | 4/2016 | Borlick | .............. | H04L 67/1097 726/25 |
| 2016/0164903 A1* | 6/2016 | Murynets | ........... | H04L 63/1433 726/25 |
| 2016/0226913 A1* | 8/2016 | Sood | ....................... | H04L 63/20 |
| 2017/0031969 A1* | 2/2017 | Smits | .................. | G06F 11/0766 |
| 2017/0134425 A1* | 5/2017 | Albertson | .............. | H04L 63/20 |

* cited by examiner

Primary Examiner — Khang D Do
(74) Attorney, Agent, or Firm — FisherBroyles, LLP

(57) ABSTRACT

A computer-implemented method for providing supply-chain trust networks may include (1) identifying a computational partnership between a primary computing entity and a partnered computing entity, wherein the primary computing entity and the partnered computing entity are under separate control and the partnered computing entity handles at least one computing resource to be used by the primary computing entity, (2) receiving, from a computing environment controlled by the partnered computing entity and with permission from the partnered computing entity, security data that comprises information about at least one security characteristic of the computing environment, (3) analyzing the security data to make a security determination about the computing environment controlled by the partnered computing entity, and (4) providing, in response to identifying the computational partnership, the security determination about the computing environment to the primary computing entity. Various other methods, systems, and computer-readable media are also disclosed.

17 Claims, 10 Drawing Sheets

US 10,033,764 B1

SYSTEMS AND METHODS FOR PROVIDING SUPPLY-CHAIN TRUST NETWORKS

BACKGROUND

In the digital age, organizations increasingly rely on computational infrastructure and digitally-stored data to manage their affairs and conduct business. Digital transactions and communications provide systemization, flexibility, and scalability as organizations consume and provide data and data services. Accordingly, thousands of firms may participate in a single digital supply chain.

Unfortunately, increasing reliance on computational infrastructure has also brought increased exposure to digital vulnerabilities. Malicious parties may exploit the same systemization, flexibility, and scalability of digital transactions and communications that benefit organizations to propagate malware, access private data, disrupt operations, and/or engage in fraudulent transactions. Traditionally, firms have deployed firewalls and internal security systems to insulate and protect their digital operations from the untrusted outside world. However, as the cost of interconnection drops and the incentives toward establishing digital supply chains rise, security strategies that depend on isolation have become inadequate for many organizations.

When two or more firms are linked in a digital supply chain, these firms may become increasingly dependent on the security practices of other members of the supply chain. A security failure on the part of a firm in a digital supply chain may have negative effects that propagate up the chain, potentially impacting the security, the operations, and/or the reputation of partnered firms that had no control over the security practices of the original firm that led to the security failure. In addition, a firm that has been negatively impacted by another firm's security failure may have difficulty identifying the responsible firm, thereby potentially exposing the impacted firm to ongoing threats. Accordingly, the instant disclosure identifies and addresses a need for additional and improved systems and methods for providing supply-chain trust networks.

SUMMARY

As will be described in greater detail below, the instant disclosure generally relates to systems and methods for providing supply-chain trust networks by monitoring and analyzing computing environments (e.g., from within the computing environments) controlled by partnered computing entities (e.g., supply-chain partners) and providing security information resulting from the analysis to primary computing entities (e.g., entities in partnership with supply-chain partners).

In one example, a computer-implemented method for providing supply-chain trust networks may include (1) identifying a computational partnership between a primary computing entity and a partnered computing entity, where the primary computing entity and the partnered computing entity are under separate control and the partnered computing entity handles at least one computing resource to be used by the primary computing entity, (2) receiving, from a computing environment controlled by the partnered computing entity and with permission from the partnered computing entity, security data that includes information about at least one security characteristic of the computing environment, (3) analyzing the security data to make a security determination about the computing environment controlled by the partnered computing entity, and (4) providing, in response to identifying the computational partnership, the security determination about the computing environment controlled by the partnered computing entity to the primary computing entity.

In one embodiment, (1) receiving the security data includes receiving the security data at a third-party computing system that is not controlled either by the primary computing entity or the partnered computing entity, (2) analyzing the security data includes analyzing the security data at the third-party computing system, and (3) providing the security determination includes providing the security determination from the third-party computing system.

In one embodiment, the primary computing entity may lack access to the computing environment controlled by the partnered computing entity and therefore is not permitted to observe the security data without cooperation from the partnered computing entity.

In some examples, identifying the computational partnership may include (1) receiving, from the primary computing entity, an identifier of the partnered computing entity as a computational partner of the primary computing entity and (2) receiving, from the partnered computing entity, an agreement to provide the security data from the computing environment controlled by the partnered computing entity.

In one embodiment, the partnered computing entity may deploy a telemetry collector within the computing environment controlled by the partnered computing entity to collect the security data and to provide the security data for external analysis.

In one embodiment, the computer-implemented method may further include receiving, from the primary computing entity, a security requirement to apply to the partnered computing entity.

In one embodiment, the computer-implemented method may further include receiving, from the partnered computing entity, an agreement to meet the security requirement.

In some examples, the computer-implemented method may further include comparing the security determination with the security requirement to determine whether the partnered computing entity meets the security requirement.

In some examples, the computer-implemented method may further include reporting to the primary computing entity whether the partnered computing entity meets the security requirement.

In one embodiment, (1) analyzing the security data may include identifying an indicator of a security threat in the security data that matches an indicator of a security threat from a computing environment controlled by the primary computing entity and (2) making the security determination may include inferring that the security threat from the computing environment controlled by the primary computing entity originated from the partnered computing entity based on the indicator of the security threat in the security data matching the indicator of the security threat from the computing environment controlled by the primary computing entity.

In one embodiment, the computational partnership between the primary computing entity and the partnered computing entity may entail data shared between the primary computing entity and the partnered computing entity and/or computational infrastructure shared between the primary computing entity and the partnered computing entity.

In one embodiment, the security data may include (1) software identified within the computing environment controlled by the partnered computing entity, (2) at least one data object identified within the computing environment controlled by the partnered computing entity, (3) at least one network location connected to from within the computing environment controlled by the partnered computing entity, and/or (4) at least one security-relevant setting identified within the computing environment controlled by the partnered computing entity.

In one embodiment, the security determination may include (1) a number of security failures identified within the computing environment controlled by the partnered computing entity, (2) an amount of time between a security failure and a remediation of a security failure within the computing environment controlled by the partnered computing entity, and/or (3) a measurement of compliance with a security policy.

In one embodiment, a system for implementing the above-described method may include (1) an identification module, stored in memory, that identifies a computational partnership between a primary computing entity and a partnered computing entity, where the primary computing entity and the partnered computing entity are under separate control and the partnered computing entity handles at least one computing resource to be used by the primary computing entity, (2) a receiving module, stored in memory, that receives, from a computing environment controlled by the partnered computing entity and with permission from the partnered computing entity, security data that may include information about at least one security characteristic of the computing environment, (3) an analysis module, stored in memory, that analyzes the security data to make a security determination about the computing environment controlled by the partnered computing entity, (4) a providing module, stored in memory, that provides, in response to identifying the computational partnership, the security determination about the computing environment controlled by the partnered computing entity to the primary computing entity, and (5) at least one physical processor configured to execute the identification module, the receiving module, the analysis module, and the providing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a computational partnership between a primary computing entity and a partnered computing entity, where the primary computing entity and the partnered computing entity are under separate control and the partnered computing entity handles at least one computing resource to be used by the primary computing entity, (2) receive, from a computing environment controlled by the partnered computing entity and with permission from the partnered computing entity, security data that includes information about at least one security characteristic of the computing environment, (3) analyze the security data to make a security determination about the computing environment controlled by the partnered computing entity, and (4) provide, in response to identifying the computational partnership, the security determination about the computing environment controlled by the partnered computing entity to the primary computing entity.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
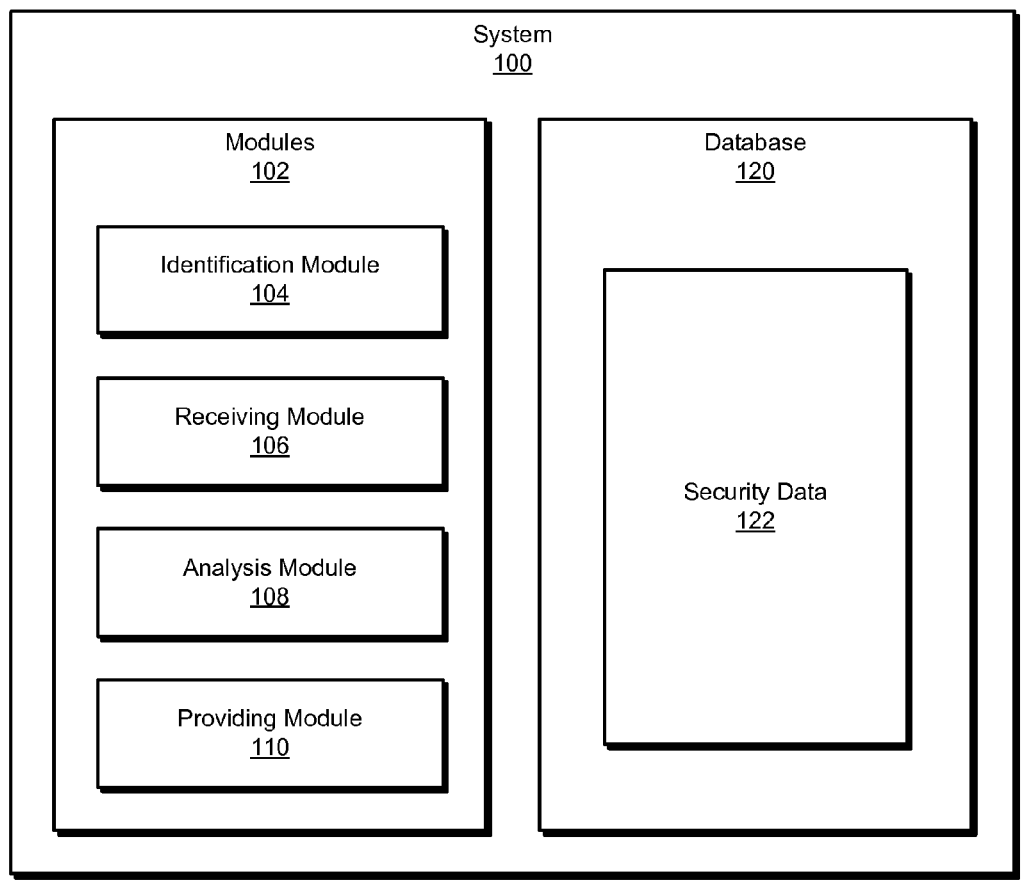
FIG. 1 is a block diagram of an exemplary system for providing supply-chain trust networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for providing supply-chain trust networks. As will be explained in greater detail below, by monitoring and analyzing computing environments (e.g., from within the computing environments) controlled by partnered computing entities (e.g., supply-chain partners) and providing security information resulting from the analysis to primary computing entities (e.g., entities in partnership with supply-chain partners), the systems and methods described herein may improve the ability of primary computing entities to enforce end-to-end security requirements in digital supply chains (without, e.g., requiring entity mergers or otherwise breaking down management autonomy or inter-entity data privacy). In addition, in some examples these systems and methods may facilitate security coordination, negotiations, and/or agreements between supply-chain partners. Furthermore, in some examples these systems and methods may track security threats that may propagate through supply-chain partnerships by leveraging security-relevant data internal to separate supply-chain partners.

The following will provide, with reference to FIGS. 1-2 and 4-8, detailed descriptions of exemplary systems for providing supply-chain trust networks. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 9 and 10, respectively.

FIG. 1 is a block diagram of exemplary system 100 for providing supply-chain trust networks. As illustrated in this figure, exemplary system 100 may include one or more modules 102 for performing one or more tasks. For example, and as will be explained in greater detail below, exemplary system 100 may include an identification module 104 that identifies a computational partnership between a primary computing entity and a partnered computing entity, where the primary computing entity and the partnered computing entity are under separate control and the partnered computing entity handles at least one computing resource to be used by the primary computing entity. Exemplary system 100 may additionally include a receiving module 106 that receives, from a computing environment controlled by the partnered computing entity and with permission from the partnered computing entity, security data that may include information about at least one security characteristic of the computing environment. Exemplary system 100 may also include an analysis module 108 that analyzes the security data to make a security determination about the computing environment controlled by the partnered computing entity. Exemplary system 100 may additionally include a providing module 110 that provides, in response to identifying the computational partnership, the security determination about the computing environment controlled by the partnered computing entity to the primary computing entity. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, primary computing system 206, and/or computing environment 208), computing system 910 in FIG. 9, and/or portions of exemplary network architecture 1000 in FIG. 10. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store security data gathered from one or more computing entities, such security data 122.

Database 120 may represent portions of a single database or computing device or a plurality of databases or computing devices. For example, database 120 may represent a portion of computing device 202, primary computing system 206, and/or computing environment 208 in FIG. 2, computing system 910 in FIG. 9, and/or portions of exemplary network architecture 1000 in FIG. 10. Alternatively, database 120 in FIG. 1 may represent one or more physically separate devices capable of being accessed by a computing device, such as computing device 202, primary computing system 206, and/or computing environment 208 in FIG. 2, computing system 910 in FIG. 9, and/or portions of exemplary network architecture 1000 in FIG. 10.

Figure 2:
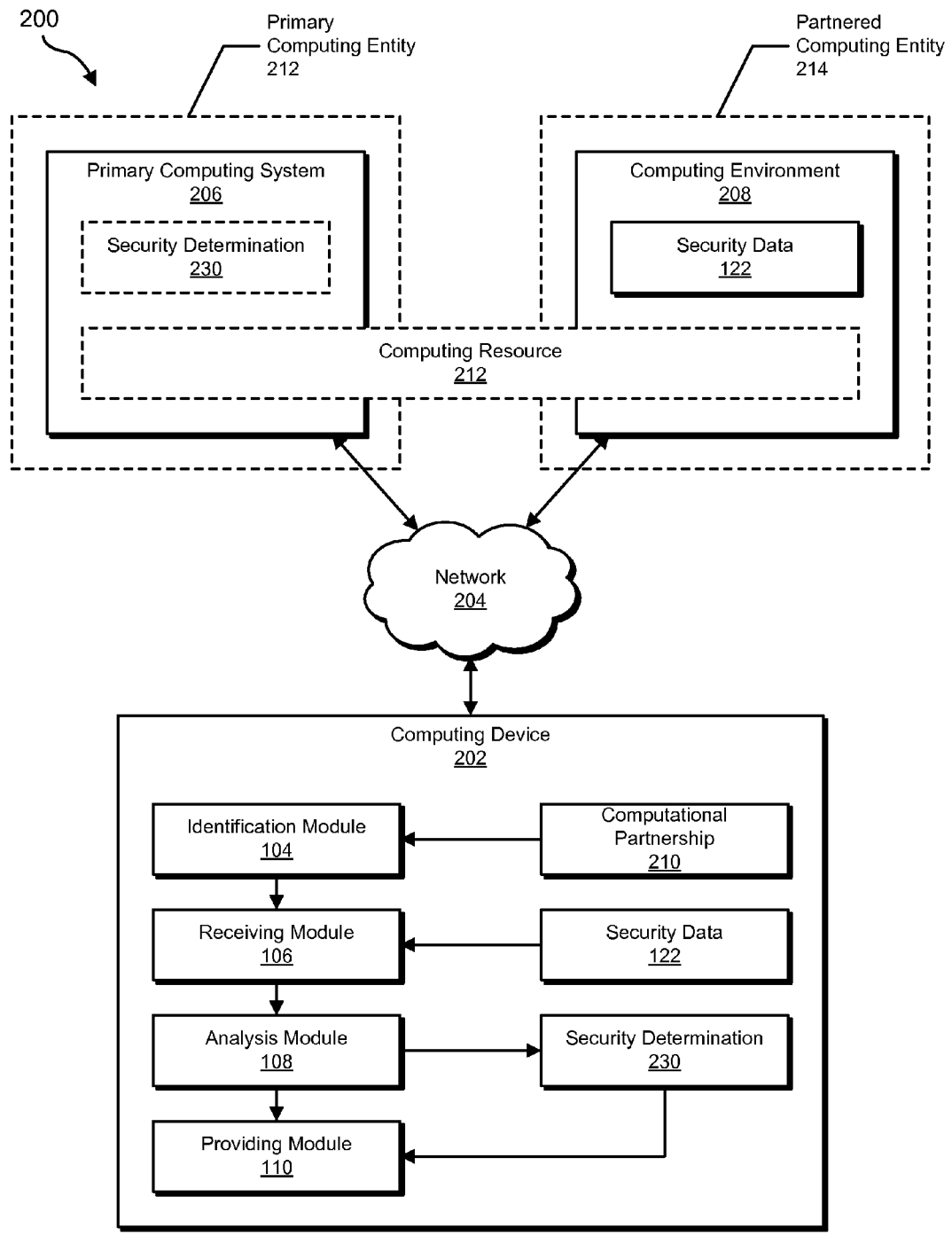
FIG. 2 is a block diagram of an additional exemplary system for providing supply-chain trust networks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a primary computing system 206 and a computing environment 208 via a network 204. In one example, computing device 202 may be programmed with one or more of modules 102 and/or may store all or a portion of the data in database 120. Additionally or alternatively, primary computing system 206 and/or computing environment 208 may be programmed with one or more of modules 102 and/or may store all or a portion of the data in database 120.

In one embodiment, one or more of modules 102 from FIG. 1 may, when executed by at least one processor of computing device 202, primary computing system 206, and/or computing environment 208, enable computing device 202, primary computing system 206, and/or computing environment 208 to providing supply-chain trust networks (e.g., computing device 202 may facilitate a trust network across a primary computing entity 212 and a partnered computing entity 214 that are members of a supply chain by providing information to primary computing entity 212 about the security of partnered computing entity 214, including, e.g., computing environment 208). For example, and as will be described in greater detail below, one or more of modules 102 may cause computing device 202, primary computing system 206, and/or computing environment 208 to provide supply-chain trust networks. For example, and as will be described in greater detail below, identification module 104 may identify a computational partnership 210 between primary computing entity 212 and partnered computing entity 214, where primary computing entity 212 and partnered computing entity 214 are under separate control and partnered computing entity 214 handles at least one computing resource 212 to be used by primary computing entity 212. Receiving module 106 may receive, from a computing environment 208 controlled by partnered computing entity 214 and with permission from partnered computing entity 214, security data 122 that may include information about at least one security characteristic of computing environment 208. Analysis module 108 may analyze security data 122 to make a security determination 230 about computing environment 208 controlled by partnered computing entity 214. Providing module 110 may provide, in response to identifying computational partnership 210, security determination 230 about computing environment 208 controlled by partnered computing entity 214 to primary computing entity 212 (e.g., to primary computing system 206 controlled by primary computing entity 212).

Computing device 202 generally represents any type or form of computing device that is capable of reading computer-executable instructions. Examples of computing device 202 include, without limitation, application servers and database servers configured to provide various database services and/or run certain software applications.

Primary computing system 206 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 910 in FIG. 9, or any other suitable computing device.

Computing environment 208 generally represents any type or form of computing device (and/or computing environment provided by one or more computing devices) capable of reading computer-executable instructions. Examples of computing environment 208 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 910 in FIG. 9, or any other suitable computing device, and/or any suitable computing environment provided by such computing devices.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1000 in FIG. 10, or the like. Network 204 may facilitate communication or data transfer using wireless or wired connections. In one embodiment, network 204 may facilitate communication between computing device 202, primary computing system 206, and/or computing environment 208.

Figure 3:
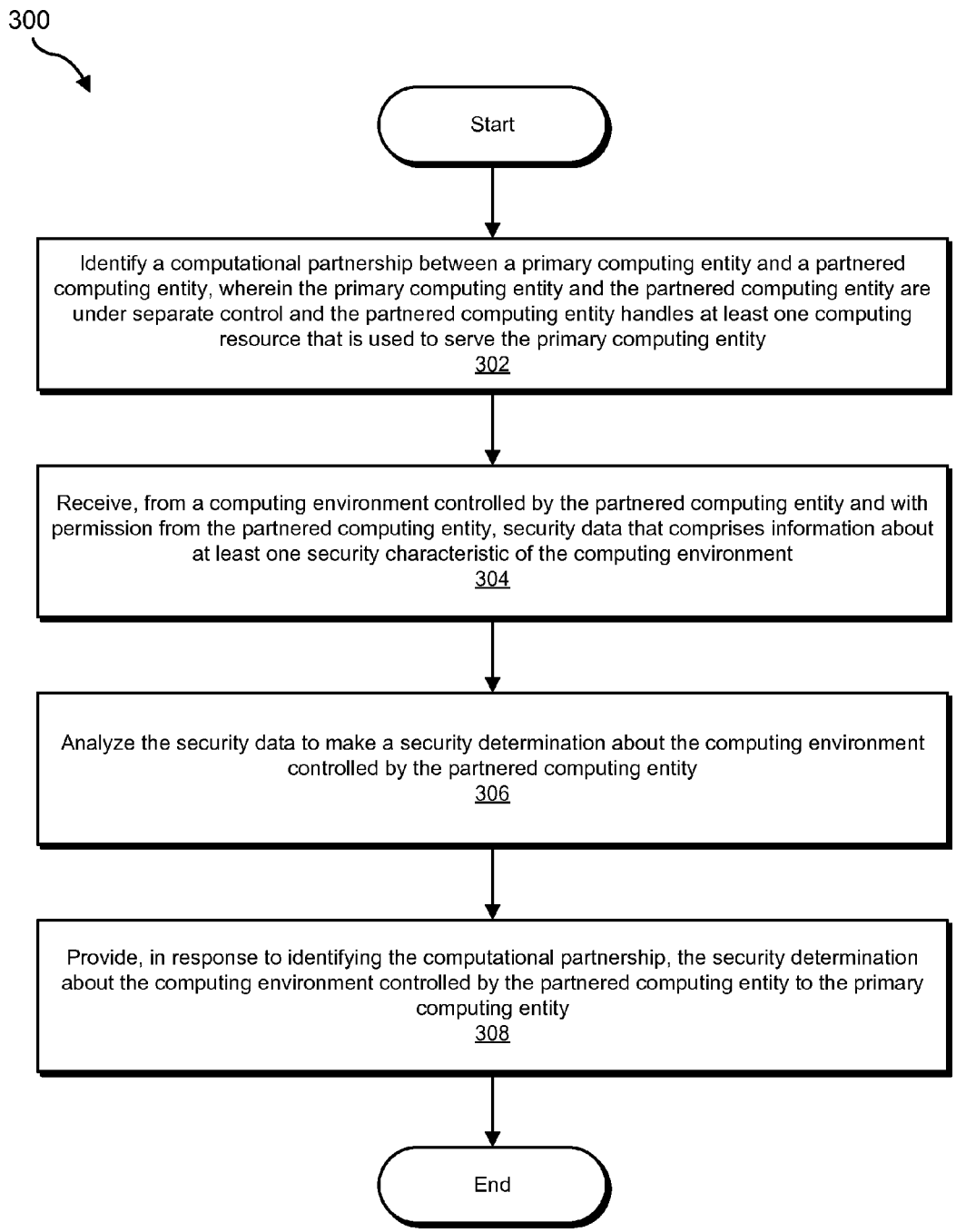
FIG. 3 is a flow diagram of an exemplary method for providing supply-chain trust networks.

FIG. 3 is a flow diagram of an exemplary computer-implemented method 300 for providing supply-chain trust networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 910 in FIG. 9, and/or portions of exemplary network architecture 1000 in FIG. 10.

As illustrated in FIG. 3, at step 302, one or more of the systems described herein may identify a computational partnership between a primary computing entity and a partnered computing entity, where the primary computing entity and the partnered computing entity are under separate control and the partnered computing entity handles at least one computing resource to be used by the primary computing entity. For example, identification module 104 may, as part of computing device 202 in FIG. 2, identify computational partnership 210 between primary computing entity 212 and partnered computing entity 214, where primary computing entity 212 and partnered computing entity 214 are under separate control and partnered computing entity 214 handles at least one computing resource 212 to be used by primary computing entity 212.

The term "computational partnership," as used herein, generally refers to any relationship between two entities that involves one entity handling a computing resource to be used by the other entity. In some examples, the term "computational partnership" may refer to an ongoing relationship where one entity handles a computing resource to be used by the other entity on a regular basis, an ongoing basis, and/or an on-demand basis. In one example, the term "computational partnership" may refer to a computational and/or digital supply-chain partnership, where one entity provides a computational and/or digital product and/or service to the other entity (e.g., on an ongoing, regular basis, and/or on-demand basis). In some examples, the term "computational partnership" may refer to an exclusive or partially exclusive relationship (e.g., where the primary computing entity accepts interaction with the partnered computing entity, including, e.g., the partnered computing entity handling a computing resource to be used by the primary computing entity, on the basis of the computational partnership). Accordingly, in some examples the term "computational partnership" may refer to an explicitly established partnership and/or a partnership that is subject to explicit terms and/or agreements. As can be appreciated, the computational partnership may entail a relationship between otherwise separate entities (e.g., entities under separate ownership, control, management, and/or administration) that do not generally share ownership, control, management, and/or administration of data and/or computational infrastructure and/or that maintain separate security environments for their respective computational infrastructures and/or data stores.

In some examples, the computational partnership between the primary computing entity and the partnered computing entity may entail data being shared between the primary computing entity and the partnered computing entity. For example, the primary computing entity may be provided access to data handled, managed, and/or generated by the partnered computing entity. Additionally or alternatively, the partnered computing entity may be provided access to data handled, managed, and/or generated by the partnered computing entity. In some examples, the computational partnership may entail the partnered computing entity providing data and/or a computational service to the primary computing entity (e.g., as input to one or more computational processes run by the primary computing entity).

In some examples, the computational partnership between the primary computing entity and the partnered computing entity may entail computational infrastructure being shared between the primary computing entity and the partnered computing entity. For example, the computational partnership may include hardware and/or software that is used and/or connected to by both the primary computing entity and the partnered computing entity.

The term "computing entity," as used herein, generally refers to any entity (e.g., organization, association, firm, and/or individual) that owns, manages, and/or controls one or more computing resources (e.g., to the exclusion of other entities). In some examples, the term "computing entity" may refer to an entity that generally obstructs external access to one or more computing resources under control of the entity (e.g., outside of specific actions and/or relationships undertaken by the entity) and/or that generally obstructs the ingestion of data to one or more computing resources under control of the entity (e.g., outside of specific actions and/or relationships undertaken by the entity). Accordingly, in some examples a computing entity may use one or more security systems and/or protocols to prevent unauthorized access to and/or interference with one or more computing resources under control of the entity.

The term "primary computing entity" (or "primary") as used herein, may refer to any computing entity whose computing security concerns extend beyond computing resources controlled by the entity to one or more computing resources not controlled by the entity (but, e.g., upon which the entity may rely). For example, the term "primary computing entity" may refer to a computing entity that receives data from and/or makes use of a computational service provided by a partnered computing entity. In some examples, the term "primary computing entity" may refer to a computing entity that relies upon and/or partners with one or more entities down a computational supply chain. In some examples, the term "primary computing entity" may refer to a computing entity that makes a decision about whether to partner with one or more additional entities in performing computational tasks and/or transactions. Examples of primary computing entities may include, without limitations, banks, credit card processors, and manufacturers.

The term "partnered computing entity" (or "supplier"), as used herein, may refer to any computing entity whose potential computing security failures and/or vulnerabilities (e.g., failures and/or vulnerabilities that relate to one or more computing resources under the control of the computing entity) may negatively impact a primary computing entity and/or violate one or more security standards of the primary computing entity. For example, the term "partnered computing entity" may refer to a computing entity that provides data and/or a computational service to a primary computing entity. In some examples, the term "partnered computing entity" may refer to a computing entity upon which a partner up a computational supply chain relies. In some examples, the term "partnered computing entity" may refer to a computing entity whose partnership with a primary computing entity is subject to one or more security standards and/or agreements.

The term "computing resource," as used herein, generally refers to any resource that may be used in computational tasks. For example, the term "computing resource" may refer, without limitation, to data, software, hardware, and/or a combination of the same.

Identification module 104 may identify the computational partnership in any of a variety of ways. For example, identification module 104 may identify a database of computational partnerships and determine that the primary computing entity and the partnered computing entity are in a computational partnership. In some examples, identification module 104 may identify the computational partnership through an enrollment and/or registration performed by the partnered computing entity and/or the primary computing entity. For example, identification module 104 may receive, from the primary computing entity, an identifier of the partnered computing entity as a computational partner of the primary computing entity and receive, from the partnered computing entity, an identifier of the primary computing entity as a computational partner. In some examples, identification module 104 may also receive (separately or implicitly as a part of a registration process by the partnered computing entity) an agreement by the partnered computing entity to provide information (e.g., security data) from the computing environment controlled by the partnered computing entity to the primary computing entity. For example, as will be explained in greater detail below, in some examples the primary computing entity may deploy one or more telemetry collectors within the computing environment controlled by the partnered computing entity that gather security-relevant data from the computing environment to provide information to the primary computing entity regarding the security posture of the partnered computing entity and/or the computing environment.

Accordingly, in some examples one or more of the systems described herein (e.g., identification module 104) may register one or more computing entities (e.g., to define partnerships and/or security agreements within a computational supply chain). In one example, identification module 104 may receive, from the primary computing entity, a security requirement to apply to the partnered computing entity. Additionally or alternatively, identification module 104 may receive, from the partnered computing entity, an agreement to meet the security requirement. In some examples, identification module 104 may present an interface to the primary computing entity and/or the partnered computing entity for entering into a security monitoring agreement, a security requirements agreement, and/or for negotiating one or more elements of such agreements. For example, identification module 104 may present an interface to the primary computing entity for defining one or more monitoring requirements and/or one or more security metric requirements. The primary computing entity may select and/or define one or more requirements via the interface provided by identification module 104. Identification module 104 may then present an interface to the partnered computing entity allowing the partnered computing entity to agree to the stipulated requirements, to refuse the stipulated requirements, and/or to propose a modification and/or exception to the stipulated requirements. In some examples, identification module 104 may initiate a computational supply-chain relationship (e.g., allow the partnered computing entity to access one or more computing resources from and/or to submit and/or provide one or more computing resources to the primary computing entity) in response to a successful agreement and enrollment by both the primary computing entity and the partnered computing entity. In some examples, identification module 104 may identify multiple potential supply-chain relationships (e.g., with differing restrictions) and initiate different supply-chain relationships based on the particular agreement reached (e.g., a more restrictive relationship when the partnered computing entity agrees to fewer and/or lower requirements).

Figure 4:
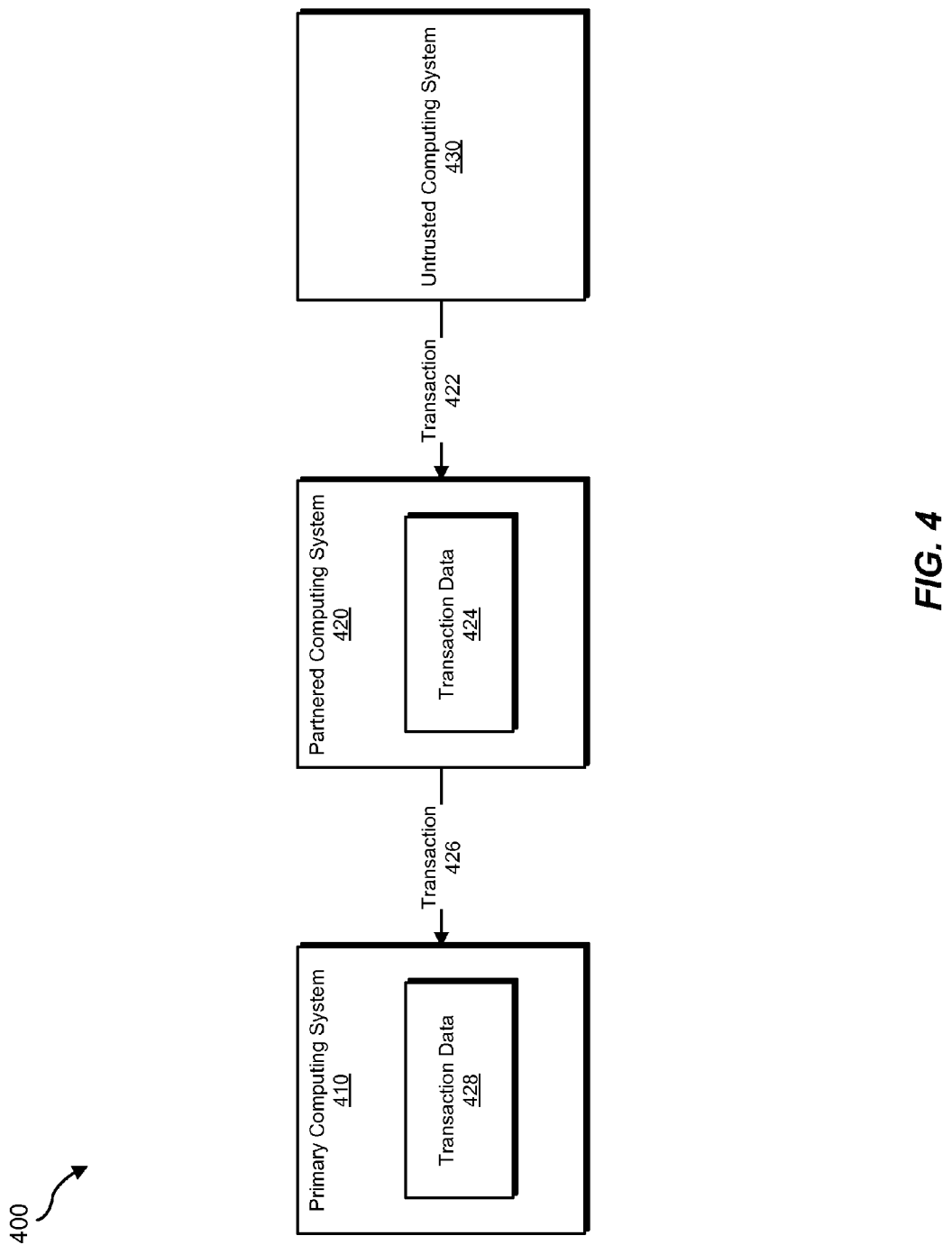
FIG. 4 is a block diagram of an exemplary computing system for providing supply-chain trust networks.

To provide an example of a computational partnership, FIG. 4 illustrates an exemplary system 400. As shown in FIG. 4, system 400 may include a primary computing system 410, a partnered computing system 420, and an untrusted computing system 430. In one example, an untrusted computing system 430 may initiate a transaction 422 with partnered computing system 420 (resulting in transaction data 424). Partnered computing system 420 may then initiate a transaction 426 with primary computing system 410 on the basis of transaction data 424, resulting in transaction data 428. Primary computing system 410 may accept transaction 426 initiated by partnered computing system 420 on the basis of the computational partnership between primary computing system 410 and primary computing system 420.

As may be appreciated, a security failure by partnered computing system 420 may expose primary computing system 410 to a security vulnerability. For example, if partnered computing system 420 failed to properly evaluate untrusted computing system 430, to properly screen transaction 422, to properly scan transaction data 424, and/or to properly prevent other parties from observing and/or interfering with transaction 422 and/or transaction data 424, then transaction data 428 may be compromised (e.g., with malware, with a fraudulent transaction, with an improperly exposed transaction, etc.), thereby negatively impacting the proper operation of primary computing system 410. Accordingly, as detailed herein, the systems herein may recognize the computational partnership between an entity responsible for primary computing system 410 and an entity responsible for partnered computing system 420 and provide security information derived from security data observed from within partnered computing system 420 (e.g., as allowed by the entity in control of partnered computing system 420) to the entity in control of primary computing system 410. In this manner, the entity in control of primary computing system 410 may effectively include partnered computing system 420 within known security bounds (without, e.g., compromising all private data and control over partnered computing system 420 to the entity in control of primary computing system 410).

Figure 5:
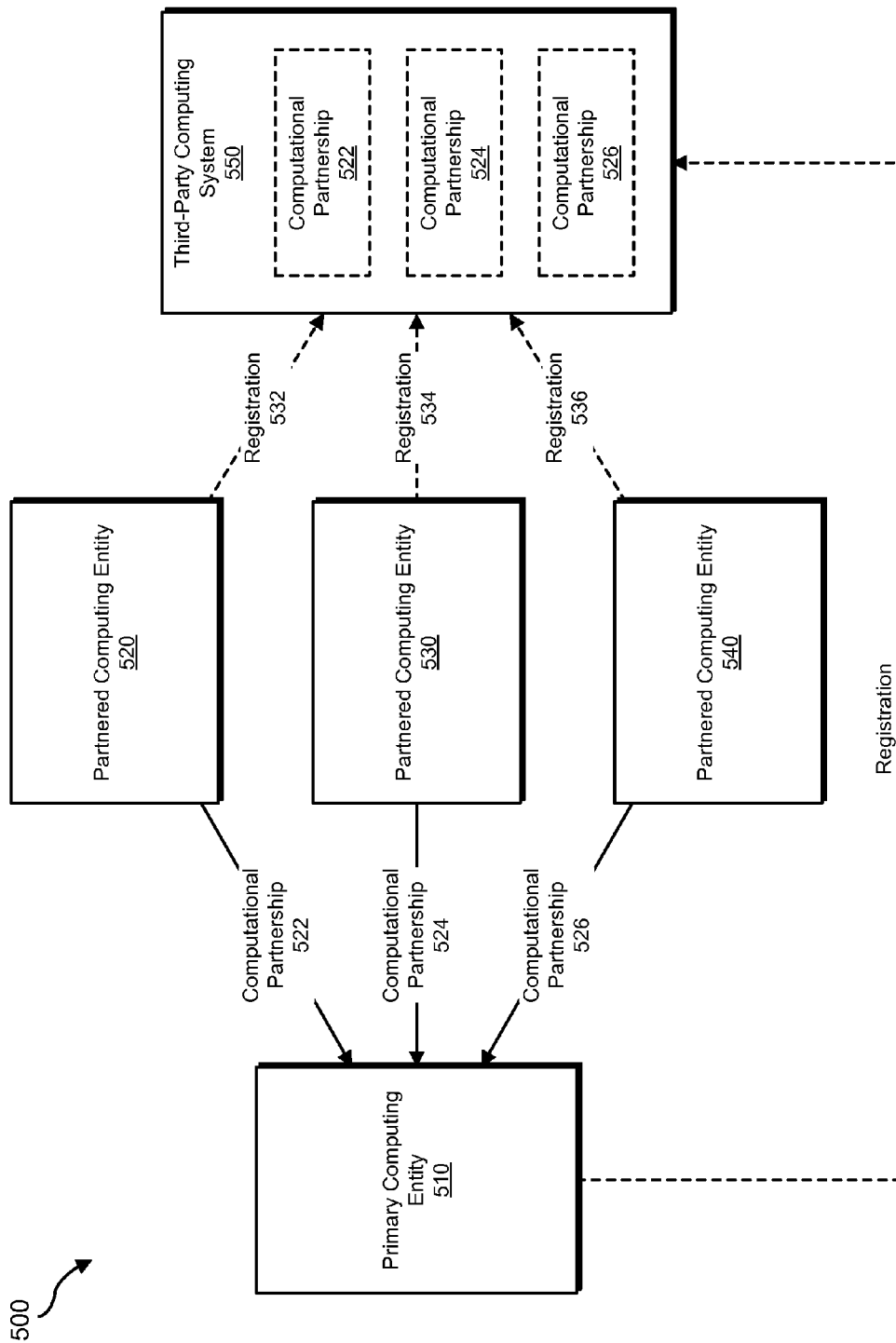
FIG. 5 is a block diagram of an exemplary computing system for providing supply-chain trust networks.

To provide an example of identifying computational partnerships, FIG. 5 illustrates an exemplary system 500. As shown in FIG. 5, system 500 may include a primary computing entity 510, partnered computing entities 520, 530, and 540, and a third-party computing system 550. In one example, partnered computing entities 520, 530, and 540 may represent three distinct computational supply-chain partners with primary computing entity 510. Accordingly, primary computing entity 510 may perform a registration 512 with third-party computing system 550 that identifies partnered computing entities 520, 530, and 540 as computational partners. Likewise, partnered computing entity 520 may perform a registration 532 with third-party computing system 550 that identifies primary computing entity 510 as a computational partner (e.g., that is entitled to security information about partnered computing entity 520); partnered computing entity 530 may perform a registration 533 with third-party computing system 550 that identifies primary computing entity 510 as a computational partner; and partnered computing entity 540 may perform a registration 536 with third-party computing system 550 that identifies primary computing entity 510 as a computational partner. As a consequence of registration 512 and registrations 532, 534, and 536, third-party computing system 550 may record computational partnerships 522, 524, and 526, respectively. Identification module 104 may therefore (e.g., as a part of third-party computing system 550) identify computational partnership 522, 524, and/or 526.

Returning to FIG. 3, at step 304, one or more of the systems described herein may receive, from a computing environment controlled by the partnered computing entity and with permission from the partnered computing entity, security data that may include information about at least one security characteristic of the computing environment. For example, receiving module 106 may, as part of computing device 202 in FIG. 2, receive, from computing environment 208 controlled by partnered computing entity 214 and with permission from partnered computing entity 214, security data 122 that may include information about at least one security characteristic of computing environment 208.

The computing environment may be controlled by the partnered computing entity by any of a variety of controls. For example, the computing environment may be controlled by the partnered computing entity by ownership of one or more computing devices that constitute and/or create the computing device; by rights delegated to the partnered computing entity to control the computing environment; by one or more computing interfaces that are exposed to the partnered computing entity (but not, e.g., to the general public); by one or more security systems and or protocols that prevent intrusion into the computing environment; by one or more physical access restrictions that allow the partnered computing entity access but restrict access to the general public (e.g., the computing environment being hosted on property owned and/or controlled by the partnered computing entity); etc.

The term "security data," as used herein, generally refers to any data relevant to making a security assessment. In some examples, the security data may include data that was gathered from within the computing environment controlled by the partnered computing entity. For example, the partnered computing entity may control the computing environment so as to generally prevent others from accessing the computing environment and/or viewing internal details of the computing environment. Accordingly, the security data may include information that would ordinarily be inaccessible to entities other than the partnered computing entity (such as the primary computing entity).

The security data may include any of a variety of data. For example, the security data may include software identified within the computing environment controlled by the partnered computing entity. Accordingly, the security data may include information identifying applications that are installed within the computing environment and/or processes that execute within the computing environment. Additionally or alternatively, the security data may include other information about such applications and/or processes, including execution times, executions sequences, access patterns (e.g., who initiated the applications), execution contexts, associated observed behaviors, etc. In some examples, the security data may have been pseudonymized and/or otherwise stripped of private information before being sent out of the computing environment and received by receiving module 106. For example, the security data may specify types of applications rather than specific applications. Additionally or alternative, the security data may specify whether an application is an out-of-date and/or insecure version without specifying which application is out-of-date and/or what version was observed.

In another example, the security data may include at least one data object identified within the computing environment controlled by the partnered computing entity. For example, the security data may include data identifying one or more files or documents and/or the content of one or more files or documents observed within the computing environment (e.g. being stored, being accessed, and/or being transmitted). In some examples, the security data may include one or more hashes of one or more documents observed within the computing environment (e.g., potentially sensitive documents). In some examples, the security data may have been pseudonymized, and only indicate a classification of the data object and/or content within the data object. For example, the security data may indicate that a document within the computing environment includes sensitive content without revealing the sensitive content. In some examples, the security data may include information about how the data object was observed as being stored, access, used, handled, and/or transmitted.

In one example, the security data may specifically include information about documents provided to the partnered computing entity by the primary computing entity. For example, when a document is observed as being sent from the primary computing entity to the partnered computing entity (e.g., via email, cloud file sharing, and/or transmission via the systems described herein), one or more of the systems described herein may generate a fingerprint of the document and send it (e.g., to be received by receiving module 106). Accordingly, as will be described in greater detail below, a telemetry collector and/or an associated data loss prevention system may observe the subsequent access and/or transmission of the document and provide corresponding information as a part of the security data. Furthermore, in some examples, as will be described in greater detail below, this may trigger a policy resulting in a notification to the primary computing entity and/or a partnered computing entity.

As another example, the security data may include at least one network location connected to from within the computing environment controlled by the partnered computing entity. For example, the security data may include data identifying one or more uniform resource locators (URLs), domains, and/or Internet Protocol (IP) addresses observed in a transmission and/or attempted transmission that was initiated from the computing environment, directed to the computing environment, and/or mediated by the computing environment. In some examples the security data may have been pseudonymized, and only indicate a classification of the network location. In some examples, the security data may include contextual information describing a context in which the network location was observed.

In an additional example, the security data may include at least one security-relevant setting identified within the computing environment controlled by the partnered computing entity. For example, the security data may include information indicating specific settings observed and/or characterizations of settings observed (e.g., whether security settings of certain types, levels, functionalities, and/or standards were observed).

As can be appreciated from the above examples, the security data may include any data that may be used in making a security assessment. In addition, in some examples the security data may have been processed, analyzed, and/or genericized before receiving module 106 receives the security data. In this manner, receiving module 106 may receive data that (1) is useful for a security analysis even though it has been removed from its original context and environment and (2) that does not unnecessarily expose private data from within the computing environment to the systems described herein and/or to the primary computing entity.

As discussed earlier, in some examples computing entities may maintain separate control over computing environments and/or resources. Accordingly, in some examples, the primary computing entity may lack access to the computing environment controlled by the partnered computing entity and therefore may not be permitted (e.g., may lack necessary permissions, credentials, and/or access points) to observe the security data without cooperation from the partnered computing entity. Accordingly, as is discussed in greater detail below, the partnered computing entity may provide access (e.g., in a limited form and/or under restricted conditions) to the computing environment. For example, the partnered computing entity may provision the computing environment with (and/or allow the computing environment to be provisioned with) an agent that observes the computing environment (e.g., from an inside perspective and/or with requisite permissions, credentials, and/or access points).

Receiving module 106 may operate in any of a variety of contexts. For example, receiving module 106 may operate on a third-party platform that is separate from (and, e.g., outside the control of) both the primary computing entity and the partnered computing entity. Accordingly, receiving module 106 may receive the security data at a third-party computing system that is not controlled either by the primary computing entity or the partnered computing entity. In some examples, this may allow the third-party computing system to further process, analyze, and/or genericize the security data before providing information to the primary computing entity, thereby potentially further protecting private information about the computing environment controlled by the partnered computing entity from the primary computing entity.

In some examples, the partnered computing entity may deploy a telemetry collector within the computing environment controlled by the partnered computing entity to collect the security data and to provide the security data for external analysis (e.g., to receiving module 106 operating on a third-party computing system). In some examples, the telemetry collector may partially process, analyze, and/or genericize the security data before providing the security data. In some examples, one or more of the systems described herein may deploy the telemetry collector within the computing environment. For example, identification module 104 may as a part a registration and/or enrollment process, install the telemetry collector on one or more computing devices within the computing environment controlled by the partnered computing entity. In some examples, the telemetry collector may operate as a part of an application wrapper, plug-in, and/or linked library. For example, as a part of the computational partnership, the primary computing entity may provide an application to the partnered computing entity (e.g., for executing transactions between the primary computing entity and the partnered computing entity). Accordingly, the primary computing entity may add the telemetry collector to the application (e.g., as an application wrapper) before providing the application to the partnered computing entity. Additionally or alternatively, the primary computing entity may provide the application to a third-party system and one or more of the systems described herein (e.g., identification module 104) may wrap the application with the telemetry collector.

In some examples, the partnered computing entity may already have installed security software within the computing environment that is capable of collecting and transmitting telemetry data. In these examples, the partnered computing entity may (e.g., directly and/or through an interface provided by one or more of the systems described herein) enable an option to provide the telemetry data and/or to grant permission for use of the telemetry data for analysis to be exposed to the primary computing entity.

Figure 6:
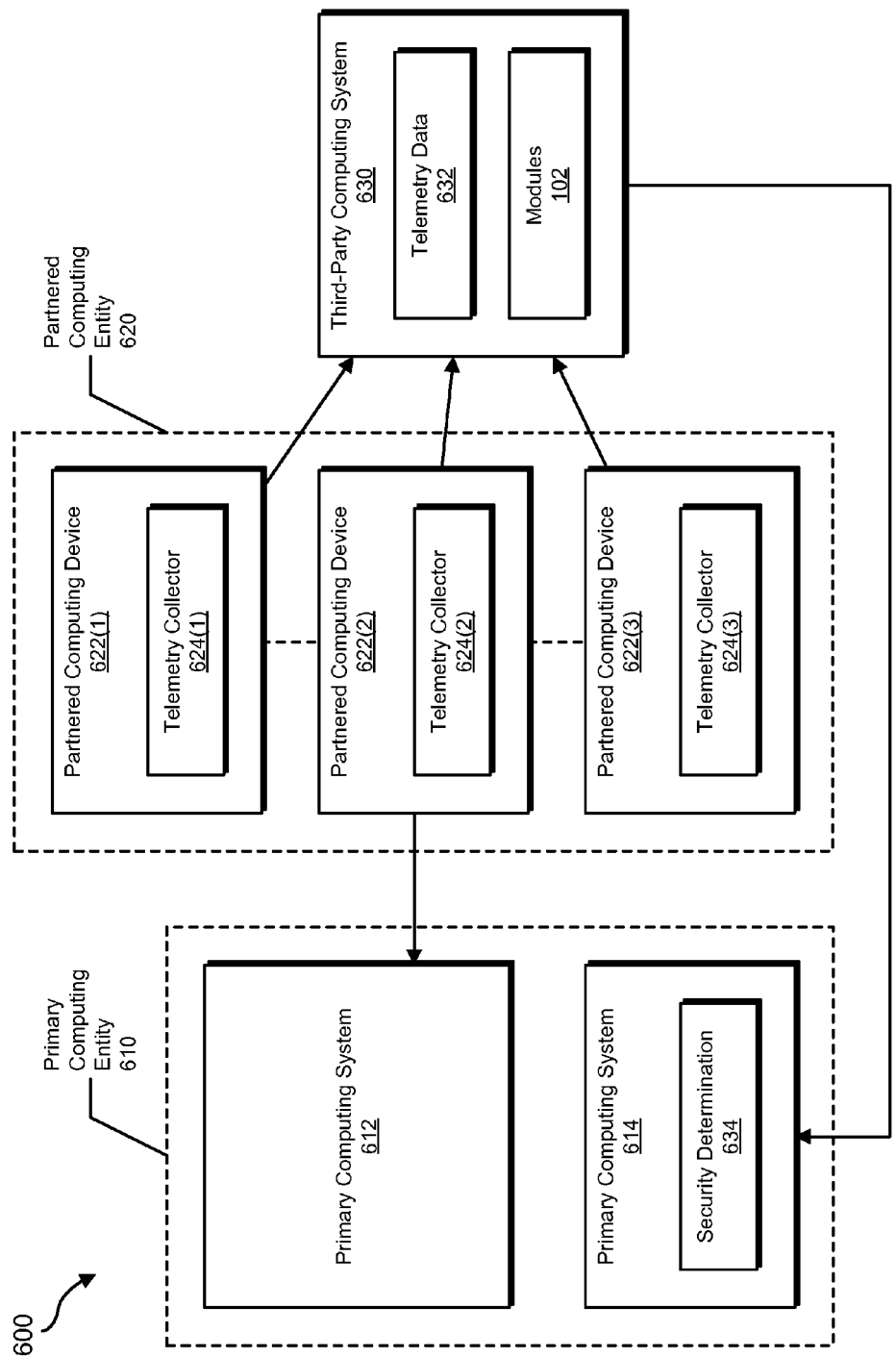
FIG. 6 is a block diagram of an exemplary computing system for providing supply-chain trust networks.

As an example of collecting telemetry data from a partnered computing entity, FIG. 6 illustrates an exemplary system 600. As shown in FIG. 6, system 600 includes a primary computing entity 610 in control of primary computing systems 612 and 614, a partnered computing entity 620 in control of partnered computing devices 622(1)-(3), and a third-party computing system 630. In one example, telemetry collectors 624(1)-(3) may be deployed on partnered computing devices 622(1)-(3), respectively (e.g., by partnered computing entity 620 and/or with the cooperation of partnered computing entity). Telemetry collectors 624(1)-(3) may send telemetry data observed from the vantage point of partnered computing devices 622(1)-(3) to third-party computing system 630, which may store the collected telemetry data as telemetry data 632.

Returning to FIG. 3, at step 306, one or more of the systems described herein may analyze the security data to make a security determination about the computing environment controlled by the partnered computing entity. For example, analysis module 108 may, as part of computing device 202 in FIG. 2, analyze security data 122 to make security determination 230 about computing environment 208 controlled by partnered computing entity 214.

The term "security determination," as used herein, generally refers to any result of an analysis of security data. In some examples, the security determination may include a characterization of the security data that may be used to assess whether a computing environment meets one or more defined security requirements. Additionally or alternatively, the security determination may include a characterization of the security data that is measurable according to one or more defined security metrics.

In one example, the security determination may include a count of the number of security failures identified within the computing environment controlled by the partnered computing entity. For example, the security determination may include a number of malware infections observed within the computing environment and/or a frequency of malware infections observed within the computing environment (e.g., a number of infections per computing device per month).

In another example, the security determination may include a measured amount of time between a security failure and a remediation of a security failure within the computing environment controlled by the partnered computing entity. For example, the security determination may include a measurement of how long a known security vulnerability (e.g., due to out-of-date software) went unaddressed. Additionally or alternatively, the security determination may include a measurement of how long malware was present on a system before an installed security system identified, quarantined, and/or removed the malware.

In an additional example, the security determination may include a measurement of compliance with a security policy. For example, the security determination may include a measurement (by a predefined metric) of the extent to which a payment system meets compliance with the Payment Card Industry Data Security Standard (PCI DSS).

As can be appreciated from the above examples, the security determination may include any data and/or result that may be used in making a determination about compliance with specified and/or desired security standards. In addition, in some examples the security determination may represent information derived from the security data but in a more processed, analyzed, and/or genericized form. For example, analysis module 108 may produce a security determination that is informative to a primary computing entity for the purposes of determining security compliance but which does not unnecessarily exposing private data gathered from the computing environment controlled by the partnered computing entity to the primary computing entity.

Analysis module 108 may operate in any suitable context. In some examples, analysis module 108 may operate at a third-party computing system. Accordingly, analysis module 108 may analyze the security data at the third-party computing system. Thus, while the third-party computing system may observe the security data, the security data may be held private from the primary computing entity.

Analysis module 108 may analyze the security data in any suitable manner. For example, analysis module 108 may aggregate the security data into a statistical summary of security observations. In some examples, analysis module 108 may analyze the security data by checking the security data for indications that the computing environment may not meet predetermined security requirements and/or may pose a security threat to the primary computing entity. For example, analysis module 108 may identify one or more security requirements specified by the primary computing entity and analyze the security data in light of the specified security requirements.

In some examples, analysis module 108 may analyze the security data for indications of specific security threats that may have reached the primary computing entity via the computational partnership with the partnered computing entity. For example, one or more of the systems described herein (e.g., receiving module 106) may receive telemetry data from the partnered computing entity. Analysis module 108 may compare telemetry data received from the primary computing entity with telemetry data received from the partnered computing entity to identify suspicious indicators common to both telemetry data sources. For example, analysis module 108 may identify an indicator of a security threat in the security data that matches an indicator of a security threat from a computing environment controlled by the primary computing entity. Analysis module 108 may then make the security determination by inferring that the security threat from the computing environment controlled by the primary computing entity originated from the partnered computing entity based on the indicator of the security threat in the security data matching the indicator of the security threat from the computing environment controlled by the primary computing entity. For example, analysis module 108 may identify a suspicious file and/or an untrusted network location identified in both the telemetry data from the partnered computing entity and the telemetry data from the primary computing entity. In some examples, analysis module 108 may infer that the security threat originated from the partnered computing entity by eliminating other partnered computing entities from consideration (e.g., because telemetry data from the other partnered computing entities did not show the suspicious indicator). Additionally or alternatively, analysis module 108 may infer that the security threat originated from the partnered computing entity rather than another partnered computing entity based on contextual information such as timing and/or sequencing information (e.g., the suspicious indicator was observed within the computing environment of the partnered computing entity before a transaction with the primary computing entity and appeared within the computing environment of the primary computing entity shortly after the transaction).

Returning to FIG. 3, at step 308, one or more of the systems described herein may provide, in response to identifying the computational partnership, the security determination about the computing environment controlled by the partnered computing entity to the primary computing entity. For example, providing module 110 may, as part of computing device 202 in FIG. 2, provide, in response to identifying computational partnership 210, security determination 230 about computing environment 208 controlled by partnered computing entity 214 to primary computing entity 212.

Providing module 110 may provide the security determination to the primary computing entity in any suitable context. For example, providing module 110 may operate at a third-party computing system and provide the security determination to the primary computing entity from the third-party computing system.

Providing module 110 may provide the security determination to the primary computing entity in any suitable manner. For example, providing module 110 may prepare a report and transmit to the report to the primary computing entity. In some examples, providing module 110 may transmit the report on a periodic basis. Additionally or alternatively, providing module 110 may transmit the report when predefined security standards have not been met by the partnered computing system. In some examples, providing module 110 may provide an interface for a primary computing entity to access the security determination on an on-demand basis.

In some examples, providing module 110 may provide a summary of security statistics and/or security attributes describing the computing environment of the partnered computing entity. As discussed above, in some examples the primary computing entity may define one or more security requirements (e.g., upon which the computational partnership is contingent and/or to which the partnered computing entity agreed). In these examples, one or more of the systems described herein (e.g., analysis module 108 and/or providing module 110) may compare the security determination with the security requirement to determine whether the partnered computing entity meets the security requirement. Accordingly, providing module 110 may report to the primary computing entity whether the partnered computing entity meets the security requirement. In some examples, providing module 110 may report to the primary computing entity how the partnered computing entity failed the security requirement and/or describe how the partnered computing entity could remedy the failure. For example, providing module 110 may recommend a security product for purchase by the partnered computing entity. Additionally or alternatively, providing module 110 may recommend a security product for purchase by the primary computing entity to provide some protection for the primary computing entity against the failure of the partnered computing entity.

In some examples, providing module 110 may also provide a security report to the partnered computing entity. For example, providing module 110 may provide a security report detailing how the partnered computing entity is out of compliance with one or more security requirements and/or agreements. In addition, providing module 110 may provide the partnered computing entity with one or more instructions and/or recommendations for meeting the security requirement and/or agreement. For example, providing module 110 may recommend a security product for purchase by the partnered computing entity. In some examples, providing module 110 may provide the partnered computing entity an option to purchase the security product (e.g., via an interface provided by providing module 110). In one example, one or more of the systems described herein (e.g., analysis module 108) may determine that the partnered computing entity is in danger of violating a security requirement and/or security agreement but has yet to do so. In this example, providing module 110 may report the projected failure of the partnered computing entity. Accordingly, providing module 110 may provide the partnered computing entity an opportunity to purchase a security product before the projected failure.

The security requirement may include any of a variety of security requirements. For example, the security requirement may include (1) a minimum average machine hygiene (e.g., a low average machine infection rate), (2) a low average time to discover threats, (3) a low average time to remediate discovered threats, (4) a minimum compliance rate with industry regulations (e.g., PCI DSS), (5) operating system and/or application minimum version and/or patching requirements, and/or (6) no hosted websites categorized as insecure.

In some examples, providing module 110 may also provide an interface for the partnered computing entity to respond to survey questions about security items (e.g., that are difficult to assess via collected telemetry data alone). In some examples, providing module 110 may also provide an interface for the primary computing entity to create and/or customize surveys for the partnered computing entity. For example, survey questions might include (1) "Have you deployed enterprise firewalls around all of your payment systems?" (2) "When was the last time you conducted a penetration test on your Internet-facing website" and/or (3) "Do you require two-factor authentication for all Virtual Private Network (VPN) access to your network?" Providing module 110 may provide a report to the primary computing entity about the survey responses and/or may provide a report to the partnered computing entity about failures to meet security requirements based on the survey responses.

Using FIG. 6 as an example of providing a security determination, system 600 illustrates third-party computing system 630 providing a security determination 634 regarding partnered computing entity 620 to primary computing system 614 controlled by primary computing entity 610.

Figure 7:
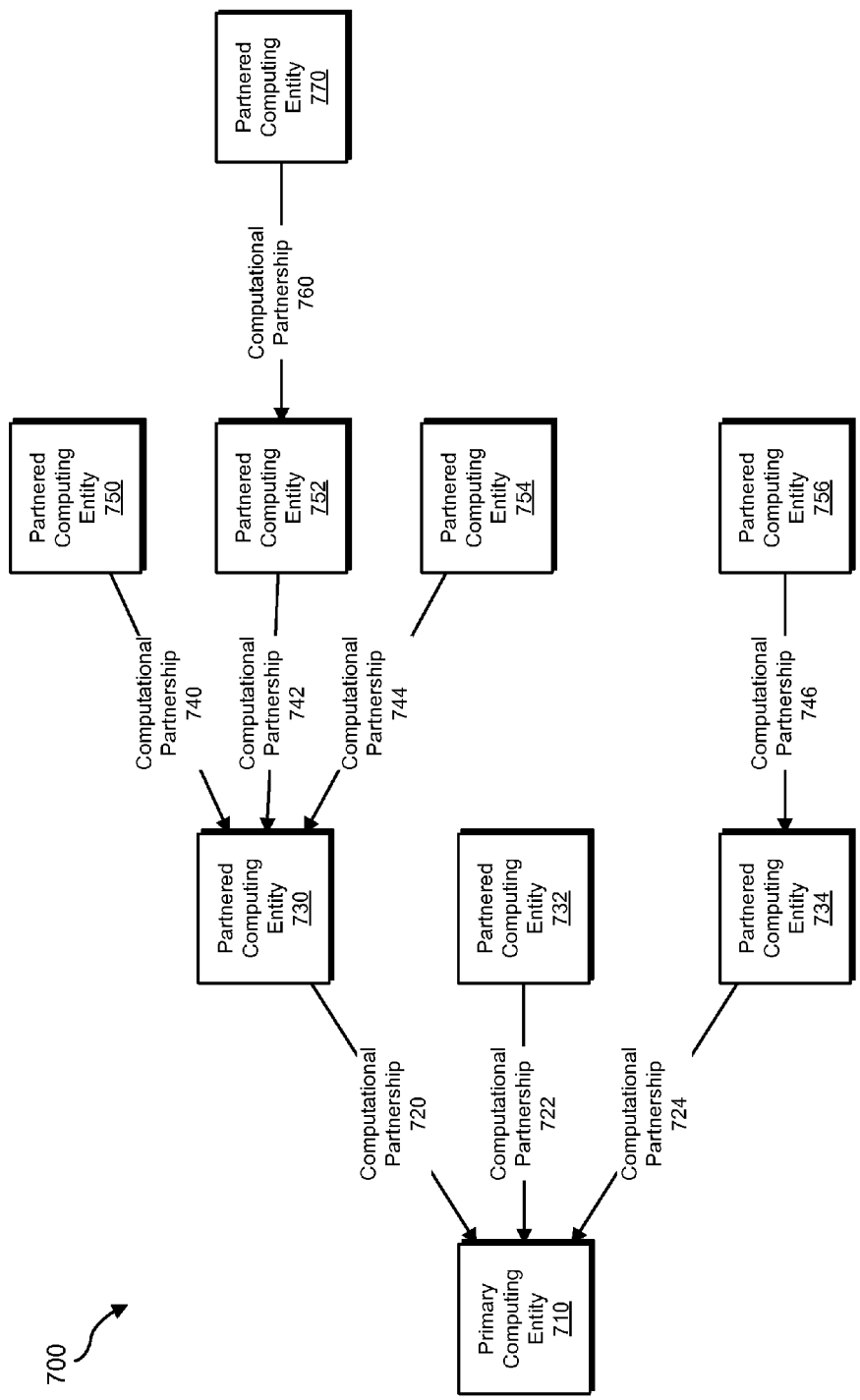
FIG. 7 is a block diagram of an exemplary computing system for providing supply-chain trust networks.

In some examples, a computational supply chain may be more than two links long. For example, the partnered computing entity may act as a primary computing entity to yet another partnered computing entity down the computational supply chain. Additionally or alternatively, the primary computing entity may act as a partnered computing entity to another computational entity up the computational supply chain. As an example, FIG. 7 illustrates an exemplary system 700. As shown in FIG. 7, system 700 includes a primary computing entity 710 in computational partnerships 720, 722, and 724 with partnered computing entities 730, 732, and 734, respectively. In addition, partnered computing entity may be in computational partnerships 740, 742, and 744 with partnered computing entities 750, 752, and 754, respectively. Likewise, partnered computing entity 734 may be in a computational partnership 746 with a partnered computing entity 756 and partnered computing entity 752 may be in a computational partnership 760 with a partnered computing entity 770. In this example, the systems described herein may analyze security data from partnered computing entities 730, 732, and 734 and report to primary computing entity 710. In addition, partnered computing entity 730 may also be enrolled in the systems described herein for receiving reports relating to partnered computing entities 750, 752, 754. Likewise, partnered computing entity may receive reports for partnered computing entity 756, and partnered computing entity 752 may receive reports for partnered computing entity 770.

In some examples, computing entities may also receive reports describing the security posture of computing entities two or more hops down the computational supply chain. For example, primary computing entity 710 may receive reports for partnered computing entities 750, 752, 754, and 756 where the systems described herein are configured to provide reports for two hops; and may receive reports for partnered computing entity 770 where the systems described herein are configured to provide reports for three (or more) hops. In one example, primary computing entity 710 may set a security requirement on partnered computing entity 730 to, in turn, set specified requirements on any partnered computing entities (e.g., partnered computing entities 750, 752, and 754). Accordingly, the systems described herein may compare the requirements and/or agreements set between partnered computing entity 730 and partnered computing entities 750, 752, and 754 to determine whether the requirement set by primary computing entity 710 has been met. In one example, partnered computing entities 750, 752, and 754 must register computational partnerships 740, 742, and 744, respectively, and submit to security monitoring and reports to be sent to partnered computing entity 730 and/or primary computing entity 710 to meet the requirement set by primary computing entity 710 on partnered computing entity 730 regarding down-chain partners. In some examples, primary computing entity 710 may receive full reports on computing entities two or more hops away (e.g., partnered computing entities 750, 752, 754, 756, and 770). Alternatively, primary computing entity 710 may receive reduced-information reports on computing entities two or more hops away. In some examples, primary computing entity 710 may receive no reports directly about computing entities that are more than a specified number of hops away, but may receive only reports from more proximate partnered computing entities about whether and to what extent down-chain requirements have been met (e.g., in the aggregate). Accordingly, primary computing entity 710 may receive relevant information about non-proximate computing entities without the non-proximate computing entities exposing private data to primary computing entity 710.

In some examples, one or more of the systems described herein may impose automatic consequences for failures to meet defined security agreements and/or thresholds. For example, providing module 110 may, in addition and/or instead of reporting a failure to meet a security requirement, may automatically block the partnered computing entity from interfacing with the primary computing entity. Additionally or alternatively, providing module 110 may restrict and/or limit the computational partnership (e.g., to a maximum number of transactions per day until the issue has been resolved and/or until the primary computing entity lifts the restriction). In one example, providing module 110 may provide failure information to a subsystem controlled by the primary computing entity and the subsystem may use the failure information to improve security and/or to impose consequences. For example, a subsystem that receives attempted transactions performed via a partnered computing entity that does not meet predefined security thresholds may reject the attempted transactions. Additionally or alternatively, the subsystem may use the security failure as a factor in deciding whether to reject the attempted transactions (e.g., separately weighting as factors an analysis of a given transaction and a security assessment of the originating partnered computing entity and rejecting transactions whose combined weighted factors fall below a predetermined threshold).

In some examples, providing module 110 may provide an interface for the primary computing entity and the partnered computing entity to renegotiate the security requirements and/or agreement, to delay and/or to lift consequences for failures, and/or to temporarily exempt a security failure from consequences.

In some examples, providing module 110 may provide an interface for the primary computing entity to evaluate hypothetical scenarios. For example, providing module 110 may provide an interface that allows the primary computing entity to enter hypothetical security requirements and then to see whether the partnered computing entity would meet the hypothetical security requirements. In examples where the primary computing entity has computational partnerships with multiple partnered computing entities, providing module 110 may provide statistical information about how many computational partnerships would be affected by the hypothetical security requirements.

Figure 8:
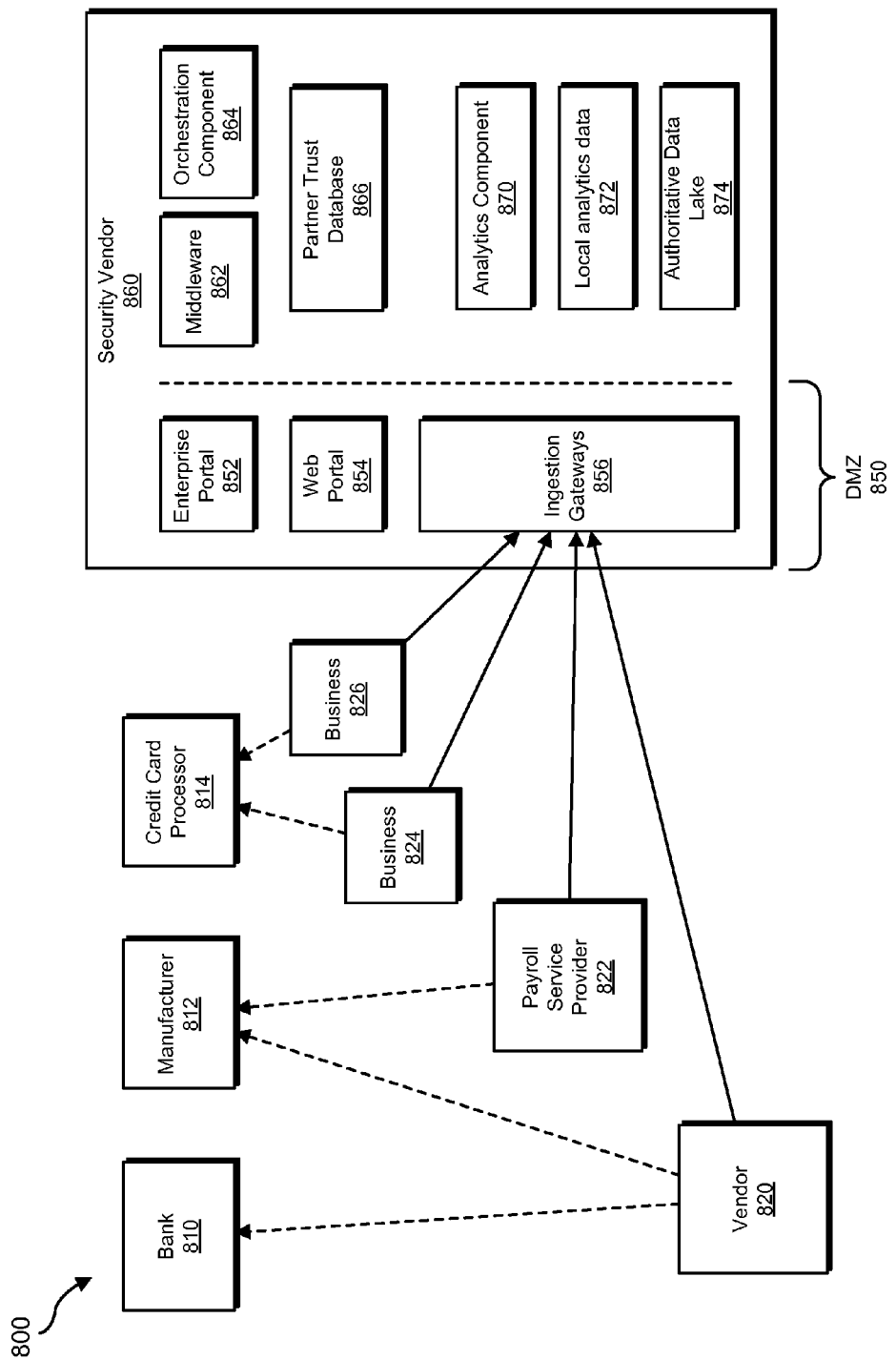
FIG. 8 is a block diagram of an exemplary computing system for providing supply-chain trust networks.

As an example of an implementation of the systems described herein, FIG. 8 illustrates an exemplary system 800. As shown in FIG. 8, system 800 includes a bank 810, a manufacturer 812, a credit card processor 814, a vendor 820, a payroll service provider 822, a business 824, a business 826, and a security vendor 860. Security vendor 860 may host, in a demilitarized zone (DMZ) 850, an enterprise portal 852, a web portal 854, and ingestion gateways 856. In addition, security vendor 860 may host middleware 862, an orchestration component 864, a partner trust database 866, an analytics component 870, and an authoritative data lake 872.

A partner trust database (e.g., partner trust database 866) may be implemented as any suitable database (e.g., a Structured Query Language (SQL) database). The partner trust database may store operational data for the systems described herein, including, e.g., entity information (e.g., company name, category, role as primary or supplier, etc.); users for each entity and their roles; configuration options for each entity; license and entitlement details for each entity; a list of suppliers associated with each entity (and, e.g., compliance policy requirements for each supplier); current and historical hygiene metrics for each supplier; current and historical compliance details for each supplier with respect to the compliance policy requirements of each primary entity; email messages, comments, and/or other communications sent between entities regarding compliance issues, policy changes, etc.

In some examples, the systems described herein may store telemetry collected from various suppliers in a single data lake (e.g., authoritative data lake 874) where these systems can mine the data to compute various metrics for supplier hygiene and compliance. In some examples, an analytics component (e.g., analytics component 870) may include one or more big-data analytical applications to compute supplier metrics based on the telemetry collected from suppliers. These analytic operations may include map-reduce jobs, APACHE HIVE jobs, etc., that run using the authoritative data lake. These analytic operations may also include purpose-built analytics outside the authoritative data lake that run on subsets of raw telemetry or batch views generated on the authoritative data lake (e.g., local analytics data 872). These analytic operations may output per-customer batch views for specified hygiene metrics for each participating supplier. The output may also include industry-wide views to enable suppliers and primaries to understand each supplier's hygiene relative to their broader industry category. The systems described herein may store the batch views within the partner trust database to be accessed by middleware 862 and/or orchestration component 864 to measure compliance, generate reports, initiate warning emails, drive remediation workflows, etc.

An enterprise portal (e.g., enterprise portal 852) may implement a front-end user interface for the systems described herein. This user interface may be used by primaries and suppliers for various workflows. Middleware (e.g., middleware 862) may implement business logic for the enterprise portal. The enterprise portal may leverage data within the partner trust database to support various activities. For example, for primaries and suppliers, the enterprise portal may support registering for partner trust network services, provisioning users for various roles, configuring subscription and product options, including specifying license keys or customer identification required to identify a company's telemetry, managing correspondence between primaries and suppliers (e.g., to drive compliance and/or address violations and/or exceptions), and/or specifying alert criteria (e.g., if a supplier falls below a specified metric, send an email to the primary and/or the supplier to initiate remediation).

For primaries, the enterprise portal may support adding and removing suppliers from the primary's supply chain, specifying compliance requirements for suppliers and/or categories of suppliers (and, e.g., negotiating changes and/or exceptions to those requirements that are mutually acceptable to the primary and a given supplier), updating compliance policies and/or criteria for each supplier (and evaluating hypothetical scenarios, such as how changing a requirement would impact the number of suppliers in compliance), monitoring the compliance of all suppliers (including compliance status, spark graphs showing supplier metrics over time, etc.), handling of incidents (e.g., out-of-compliance suppliers) via an incident management component to enable the primary to track progress toward remediation over time (including the ability to grant exemptions for suppliers on specified metrics), and/or generating compliance reports for all or for specific suppliers (e.g., for those not in compliance).

For suppliers, the enterprise portal may support granting permissions to one or more primaries to view the supplier's hygiene metrics and compliance status, viewing the compliance requirements of each primary to which the supplier is tied (and, e.g., negotiating changes to those requirements that are not acceptable to the supplier), monitoring the supplier's own hygiene metrics and compliance against various primary policies, and/or an incident manager to help the supplier resolve non-compliance issues (including, e.g., the ability to request exemptions from a primary for particular compliance requirements, root cause analysis tools to determine the source of non-compliance, and/or identifying changes such as product settings or new products to deploy that can help the supplier achieve compliance).

In some examples, a web portal (e.g., web portal 854) may enable programmatic access to hygiene and/or compliance statistics for a primary's suppliers. For example, some primaries may work with hundreds of thousands of suppliers (e.g., credit card processor 814 may work with thousands of small businesses with point-of-sale terminals). These primaries may build programmatic workflows around the hygiene information provided by the systems described herein. In some examples, the web portal may be implemented as a web server farm that holds a cached copy of all supplier metrics (in some examples, down to the granularity of information about individual supplier devices).

In some examples, an orchestration component (e.g., orchestration component 864) may orchestrate background operations of a partner trust network. For example, the orchestration component may schedule jobs to compute hygiene and compliance metrics on the analytics component, evaluate previously-generated batch view metrics against the primary's specific compliance requirements to determine compliance status, monitoring for compliance violations (and, upon discovering a violation, notifying the offending supplier and the offended primary and creating a new incident in consoles for the primary and the supplier), copying batch view output into the partner trust database to enable the enterprise portal to operate on the most recent results, copying batch view output into the web portal to support high-speed web service queries, perform garbage collection on the partner trust database, and send out invitations to suppliers that have been identified as partners of primaries. In some examples, while the analytic component may compute raw metrics for each supplier (i.e., batch views), the orchestration component may evaluate those metrics against the various criteria and/or requirements specified by the associated primary or primaries to determine compliance outcomes. Thus, in one example, the analytics component may compute the average number of infections per thousand machines per month for a particular supplier, and the orchestration component may compare that result to the acceptable thresholds set by each primary associated with that supplier (e.g., less than 50 infections per thousand machines per month for one primary, less than 35 for another primary, etc.) and then generate alerts and/or workflows if the supplier is out of compliance with one or more primaries. The orchestration component may evaluate batch views when a new batch view has been computed by the analytics component and/or in real time if a primary updates compliance requirements and/or conducts a hypothetical study.

As explained above in connection with method 300 in FIG. 3, the systems and methods described above may provide supply-chain trust networks. For example, each primary may register with a platform implementing one or more of the systems described herein and identify a list of suppliers. The primary may define a set of metrics and/or thresholds for each supplier (e.g., a specific supplier must take fewer than 1.5 days on average to remove known infections, all suppliers must be PCI DSS compliance 98% of the time, etc.). Suppliers may enroll in the platform and acknowledge the required metrics (and, e.g., negotiate any exceptions and/or changes). Each supplier may deploy a telemetry collector within the supplier's computing environment that collects, aggregates, and transmits security telemetry from various control points (e.g., endpoints, servers, firewalls, etc.) to a central big-data store. The telemetry may include, without limitation, software running on each device; URLs, domains, and IP addresses connected to by each device; security-relevant settings on each device; and hashes of sensitive documents accessed and/or transmitted. A cloud-based component may compute metrics for each supplier (e.g., the number of infections per thousand machines per month, the mean time to remediation, compliance rate with PCI DSS across payment systems, etc.) and evaluate these metrics against agreed-upon requirements for each supplier; and deliver alerts and/or reports to suppliers and the primary detailing the current compliance status of each supplier.

Figure 9:
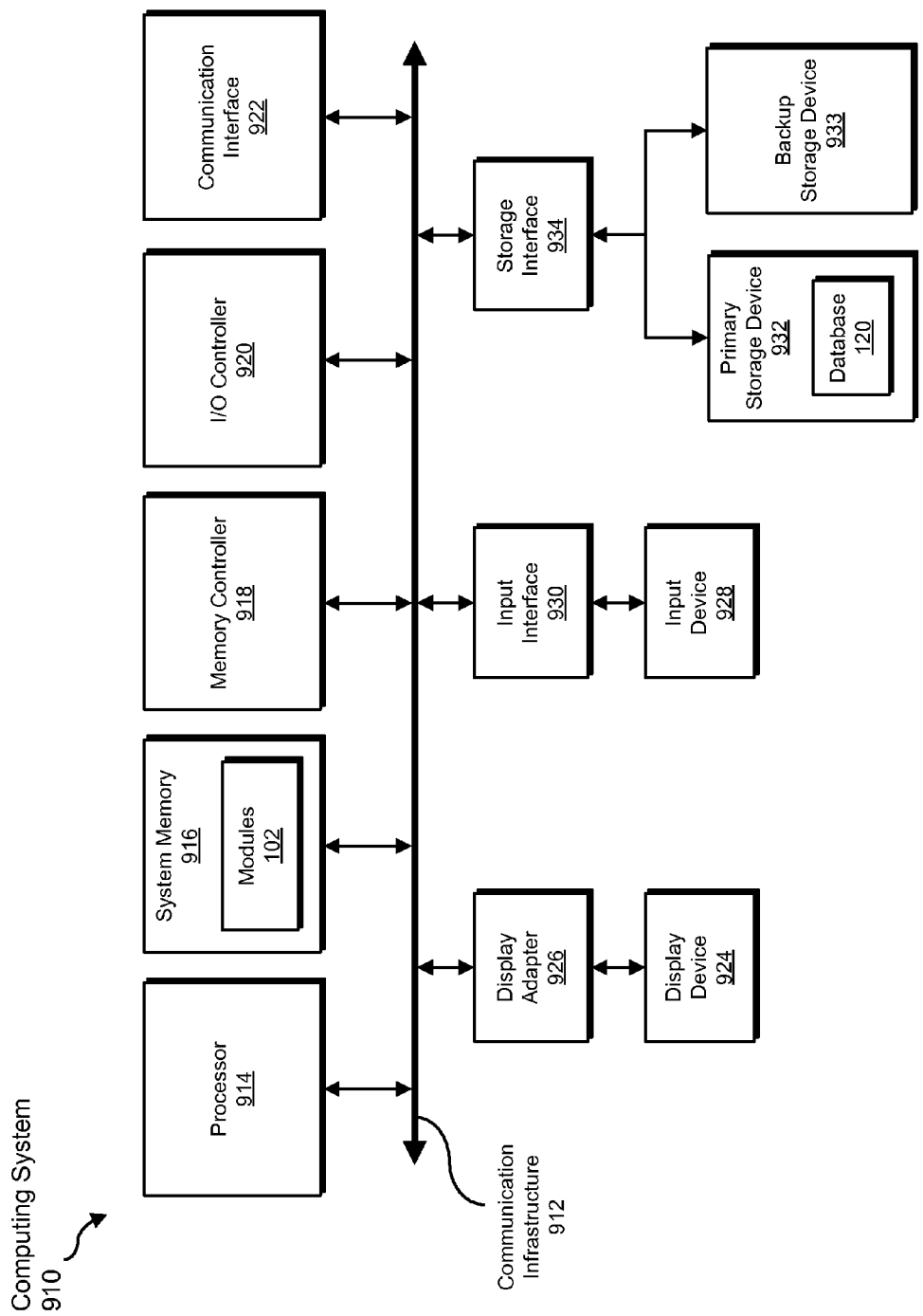
FIG. 9 is a block diagram of an exemplary computing system capable of implementing one or more of the embodiments described and/or illustrated herein.

FIG. 9 is a block diagram of an exemplary computing system 910 capable of implementing one or more of the embodiments described and/or illustrated herein. For example, all or a portion of computing system 910 may perform and/or be a means for performing, either alone or in combination with other elements, one or more of the steps described herein (such as one or more of the steps illustrated in FIG. 3). All or a portion of computing system 910 may also perform and/or be a means for performing any other steps, methods, or processes described and/or illustrated herein.

Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of physical processing unit (e.g., a hardware-implemented central processing unit) capable of processing data or interpreting and executing instructions. In certain embodiments, processor 914 may receive instructions from a software application or module. These instructions may cause processor 914 to perform the functions of one or more of the exemplary embodiments described and/or illustrated herein.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In certain embodiments, exemplary computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also include at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device.

As illustrated in FIG. 9, exemplary computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910. In one example, database 120 from FIG. 1 may be stored in primary storage device 932.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an Application Specific Integrated Circuit (ASIC) adapted to implement one or more of the exemplary embodiments disclosed herein.

Figure 10:
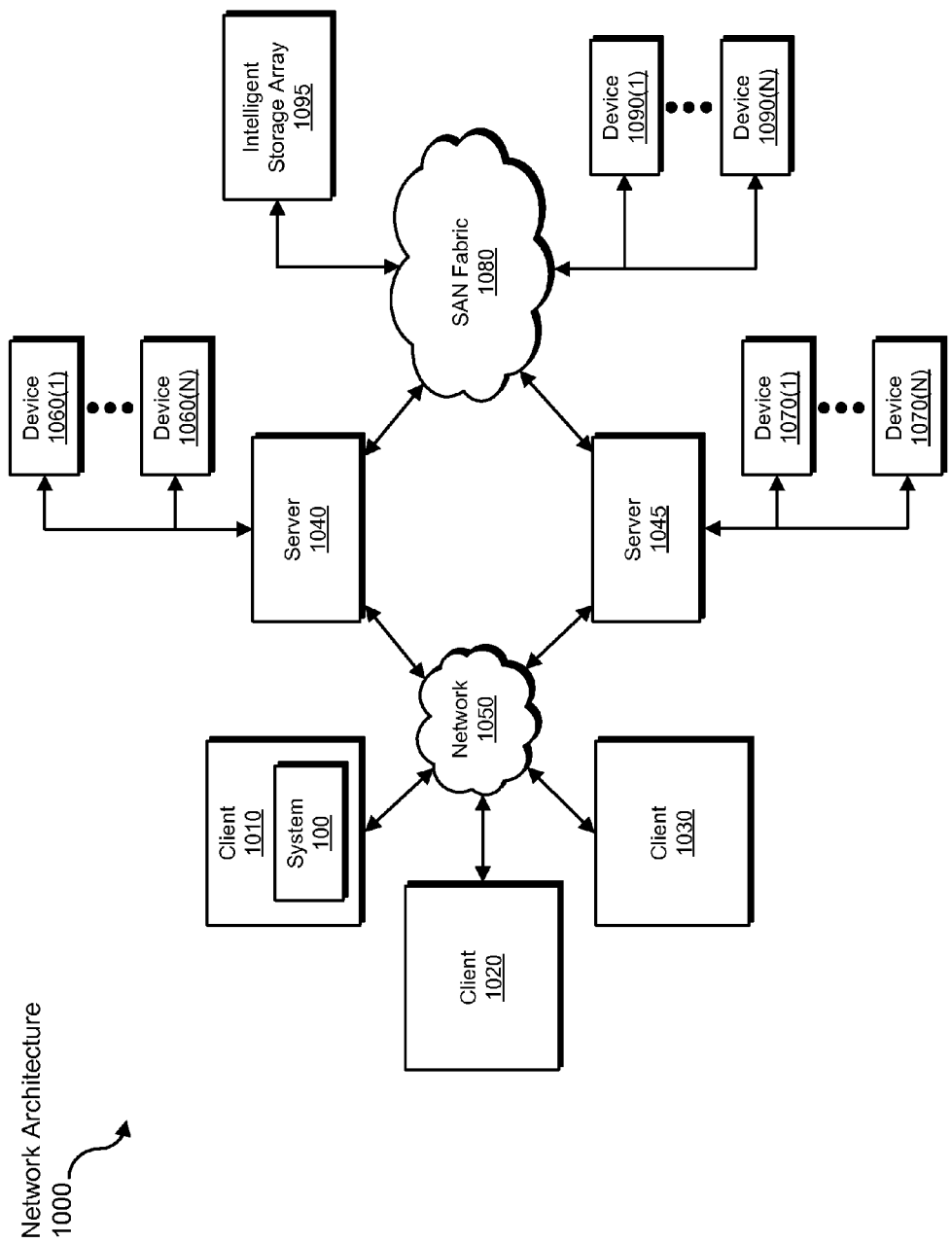
FIG. 10 is a block diagram of an exemplary computing network capable of implementing one or more of the embodiments described and/or illustrated herein.

FIG. 10 is a block diagram of an exemplary network architecture 1000 in which client systems 1010, 1020, and 1030 and servers 1040 and 1045 may be coupled to a network 1050. As detailed above, all or a portion of network architecture 1000 may perform and/or be a means for performing, either alone or in combination with other elements, one or more of the steps disclosed herein (such as one or more of the steps illustrated in FIG. 3). All or a portion of network architecture 1000 may also be used to perform and/or be a means for performing other steps and features set forth in the instant disclosure.

Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a WAN, a LAN, a PAN, or the Internet. In one example, client systems 1010, 1020, and/or 1030 and/or servers 1040 and/or 1045 may include all or a portion of system 100 from FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent Network-Attached Storage (NAS) devices configured to communicate with servers 1040 and 1045 using various protocols, such as Network File System (NFS), Server Message Block (SMB), or Common Internet File System (CIFS).

Servers 1040 and 1045 may also be connected to a Storage Area Network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050.

As detailed above, computing system 910 and/or one or more components of network architecture 1000 may perform and/or be a means for performing, either alone or in combination with other elements, one or more steps of an exemplary method for providing supply-chain trust networks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive security data to be transformed, transform the security data, output a result of the transformation to a third-party computing system, use the result of the transformation to determine a security posture of a computing environment, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for providing supply-chain trust networks, at least a portion of the method being performed by a computing device comprising at least one processor, the method comprising:
    identifying a computational partnership between a primary computing entity and a partnered computing entity, wherein the primary computing entity and the partnered computing entity are under separate control and the partnered computing entity handles at least one computing resource to be used by the primary computing entity, wherein the at least one computing resource is used in computational tasks, and wherein the identifying the computational partnership further comprises:
        receiving, from the primary computing entity, an identifier of the partnered computing entity as a computational partner of the primary computing entity; and
        receiving, from the partnered computing entity, an agreement to provide the security data from the computing environment controlled by the partnered computing entity;
    receiving, from a computing environment controlled by the partnered computing entity and with permission from the partnered computing entity, security data that comprises information about at least one security characteristic of the computing environment;
    analyzing the security data to make a security determination about the computing environment controlled by the partnered computing entity, wherein:
        analyzing the security data comprises identifying an indicator of a security threat in the security data that matches an indicator of a security threat from a computing environment controlled by the primary computing entity; and
        making the security determination comprises inferring that the security threat from the computing environment controlled by the primary computing entity originated from the partnered computing entity based on the indicator of the security threat in the security data matching the indicator of the security threat from the computing environment controlled by the primary computing entity; and
    providing, in response to identifying the computational partnership, the security determination about the computing environment controlled by the partnered computing entity to the primary computing entity.

2. The computer-implemented method of claim 1, wherein:
    receiving the security data comprises receiving the security data at a third-party computing system that is not controlled either by the primary computing entity or the partnered computing entity;
    analyzing the security data comprises analyzing the security data at the third-party computing system; and
    providing the security determination comprises providing the security determination from the third-party computing system.

3. The computer-implemented method of claim 1, wherein the primary computing entity lacks access to the computing environment controlled by the partnered computing entity and therefore is not permitted to observe the security data without cooperation from the partnered computing entity.

4. The computer-implemented method of claim 1, wherein the partnered computing entity deploys a telemetry collector within the computing environment controlled by the partnered computing entity to collect the security data and to provide the security data for external analysis.

5. The computer-implemented method of claim 1, further comprising receiving, from the primary computing entity, a security requirement to apply to the partnered computing entity.

6. The computer-implemented method of claim 5, further comprising receiving, from the partnered computing entity, an agreement to meet the security requirement.

7. The computer-implemented method of claim 5, further comprising comparing the security determination with the security requirement to determine whether the partnered computing entity meets the security requirement.

8. The computer-implemented method of claim 7, further comprising reporting to the primary computing entity whether the partnered computing entity meets the security requirement.

9. The computer-implemented method of claim 1, wherein the computational partnership between the primary computing entity and the partnered computing entity entails at least one of:
    data shared between the primary computing entity and the partnered computing entity; and
    computational infrastructure shared between the primary computing entity and the partnered computing entity.

10. The computer-implemented method of claim 1, wherein the security data comprises at least one of:
    software identified within the computing environment controlled by the partnered computing entity;
    at least one data object identified within the computing environment controlled by the partnered computing entity;
    at least one network location connected to from within the computing environment controlled by the partnered computing entity; and
    at least one security-relevant setting identified within the computing environment controlled by the partnered computing entity.

11. The computer-implemented method of claim 1, wherein the security determination comprises at least one of:
    a number of security failures identified within the computing environment controlled by the partnered computing entity;
    an amount of time between a security failure and a remediation of a security failure within the computing environment controlled by the partnered computing entity; and
    a measurement of compliance with a security policy.

12. A system for providing supply-chain trust networks, the system comprising:
    an identification module, stored in memory, that identifies a computational partnership between a primary computing entity and a partnered computing entity, wherein the primary computing entity and the partnered computing entity are under separate control and the partnered computing entity handles at least one computing resource to be used by the primary computing entity, wherein the at least one computing resource is used in computational tasks and wherein the identification module identifies the computational partnership by:
  receiving, from the primary computing entity, an identifier of the partnered computing entity as a computational partner of the primary computing entity; and
  receiving, from the partnered computing entity, an agreement to provide the security data from the computing environment controlled by the partnered computing entity;
a receiving module, stored in memory, that receives, from a computing environment controlled by the partnered computing entity and with permission from the partnered computing entity, security data that comprises information about at least one security characteristic of the computing environment;
an analysis module, stored in memory, that analyzes the security data to make a security determination about the computing environment controlled by the partnered computing entity, wherein:
  analyzing the security data comprises identifying an indicator of a security threat in the security data that matches an indicator of a security threat from a computing environment controlled by the primary computing entity; and
  making the security determination comprises inferring that the security threat from the computing environment controlled by the primary computing entity originated from the partnered computing entity based on the indicator of the security threat in the security data matching the indicator of the security threat from the computing environment controlled by the primary computing entity;
a providing module, stored in memory, that provides, in response to identifying the computational partnership, the security determination about the computing environment controlled by the partnered computing entity to the primary computing entity; and
at least one physical processor configured to execute the identification module, the receiving module, the analysis module, and the providing module.

13. The system of claim 12, wherein:
the receiving module receives the security data at a third-party computing system that is not controlled either by the primary computing entity or the partnered computing entity;
the analysis module analyzes the security data at the third-party computing system; and
the providing module provides the security determination from the third-party computing system.

14. The system of claim 12, wherein the primary computing entity lacks access to the computing environment controlled by the partnered computing entity and therefore is not permitted to observe the security data without cooperation from the partnered computing entity.

15. The system of claim 12, wherein the partnered computing entity deploys a telemetry collector within the computing environment controlled by the partnered computing entity to collect the security data and to provide the security data for external analysis.

16. The system of claim 12, the identification module receives, from the primary computing entity, a security requirement to apply to the partnered computing entity.

17. A non-transitory computer-readable medium comprising one or more computer-readable instructions that, when executed by at least one processor of a computing device, cause the computing device to:
  identify a computational partnership between a primary computing entity and a partnered computing entity, wherein the primary computing entity and the partnered computing entity are under separate control and the partnered computing entity handles at least one computing resource to be used by the primary computing entity, wherein the at least one computing resource is used in computational tasks and wherein identification of the computational partnership further comprises:
    receiving, from the primary computing entity, an identifier of the partnered computing entity as a computational partner of the primary computing entity; and
    receiving, from the partnered computing entity, an agreement to provide the security data from the computing environment controlled by the partnered computing entity;
  receive, from a computing environment controlled by the partnered computing entity and with permission from the partnered computing entity, security data that comprises information about at least one security characteristic of the computing environment;
  analyze the security data to make a security determination about the computing environment controlled by the partnered computing entity, wherein:
    analyzing the security data comprises identifying an indicator of a security threat in the security data that matches an indicator of a security threat from a computing environment controlled by the primary computing entity; and
    making the security determination comprises inferring that the security threat from the computing environment controlled by the primary computing entity originated from the partnered computing entity based on the indicator of the security threat in the security data matching the indicator of the security threat from the computing environment controlled by the primary computing entity; and
  provide, in response to identifying the computational partnership, the security determination about the computing environment controlled by the partnered computing entity to the primary computing entity.

* * * * *